F. J. COLE.
MANUFACTURE OF PIPE BENDS.
APPLICATION FILED JULY 1, 1911.
1,011,412.
Patented Dec. 12, 1911.
2 SHEETS—SHEET 1.
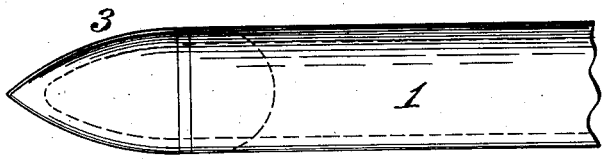
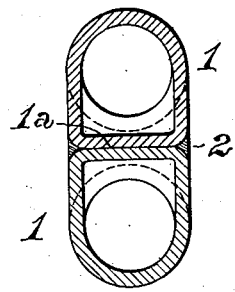
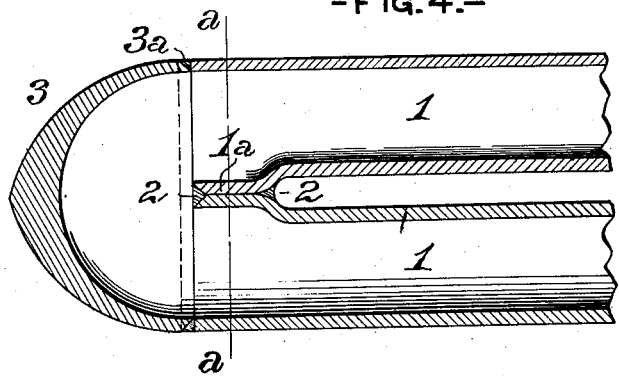
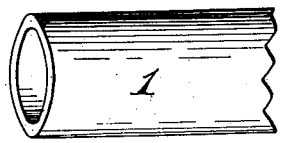
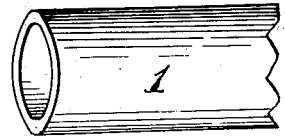
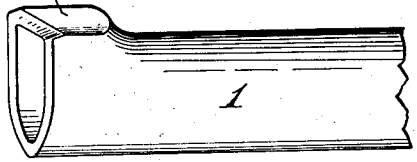
WITNESSES
Edward A. Wright
S. R. Bell
INVENTOR
Francis J. Cole
by [signature] Atty F. J. COLE.
MANUFACTURE OF PIPE BENDS.
APPLICATION FILED JULY 1, 1911.
1,011,412.
Patented Dec. 12, 1911.
2 SHEETS—SHEET 2.
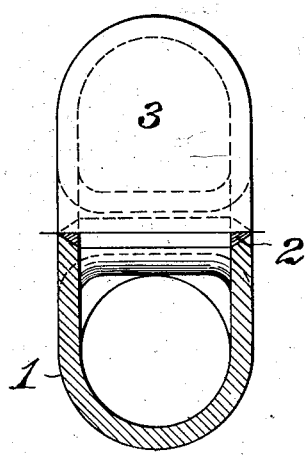
-FIG. 6.-
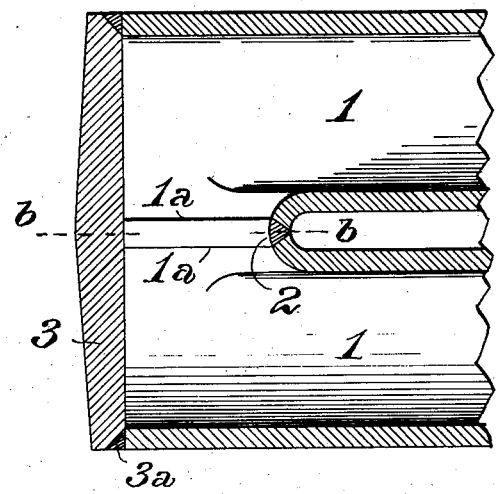
-FIG. 7.-
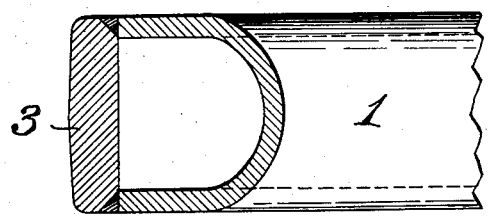
-FIG. 8.-

UNITED STATES PATENT OFFICE.

FRANCIS J. COLE, OF SCHENECTADY, NEW YORK.

MANUFACTURE OF PIPE-BENDS.

1,011,412.   Specification of Letters Patent.   Patented Dec. 12, 1911.

Application filed July 1, 1911. Serial No. 636,452.

*To all whom it may concern:*

Be it known that I, FRANCIS J. COLE, of Schenectady, in the county of Schenectady and State of New York, have invented a certain new and useful Improvement in the Manufacture of Pipe-Bends, of which improvement the following is a specification.

My invention relates to the manufacture of U-shaped pipe bends, more particularly those which are designed for use in steam boilers, superheaters, or other apparatus in which they are exposed to high temperatures or are applied for the conveyance of steam or other fluid under pressure.

The object of my invention is to provide a method of manufacture which shall require for its practice only very simple tools and accessories, with an inexpensive labor factor; which will produce bends of substantial strength and uniform character; and which will be specially adaptable to the manufacture of bends in which the two legs are required to be very close together.

The improvement claimed consists in a novel method of manufacture which is hereinafter fully set forth.

In the accompanying drawings: Figure 1 is a view in perspective, of the adjoining end portions of two lengths of pipe which are to be united by a U bend in accordance with my invention; Fig. 2, a similar view of the same after having been swaged in readiness for welding; Fig. 3, a transverse section through the same after having been welded together, taken on the line $a\ a$ of Fig. 4; Fig. 4, a vertical central section through the end portion of a completed pipe bend; Fig. 5, a top view, in elevation of the same; Fig. 6, a view, partly in elevation and partly in transverse section, of the end of a pipe bend, illustrating a modification; Fig. 7, a vertical transverse section through the same; and Fig. 8, a horizontal section, on the line $b\ b$ of Fig. 7.

Referring first to Figs. 1 to 5, inclusive, in the practice of my invention, the ends of the two pipe lengths or sections, 1, 1, which are to be connected by a U bend, are, preferably, first squared or brought to approximately true surfaces at right angles to their axes, in any suitable known manner, and each pipe length is then swaged outwardly from within, so as to provide a plane connecting face, 1ª, extending along one side for a short distance from its end, and preferably to a width equal to the full diameter of the pipe, said faces being slightly beveled on their outer ends, and curved slightly on their sides. The two pipe lengths are then set parallel one with the other, and the connecting faces, 1ª, are pressed together and welded, the V shaped spaces around the edges of the abutting faces being filled with suitable welding material, 2. A closing member, or cap, 3, which, in this instance, is of bowl or cup shape, and is beveled on its open end, the contour of the wall of which is such as to conform to that of the connected ends of the welded pipe sections, 1, 1, is then positioned on said ends, and welded thereto, welding material, 3ª, being filled in the space around the bevel of the edge of the cap, to perfect the tightness of the joint between the same and the pipe section ends. The cap, 3, may be of any suitable and preferred form, and is herein shown as having its wall progressively thickened from its open end to its top, and its top of sharpened or conical form. This form of cap is desirable for application in bends of superheater pipe loops intended for insertion in boiler flues, the sharpened cap tending to split and diffuse the furnace gases and the thickened wall to increase the life of the cap.

Figs. 6 to 8 inclusive illustrate a pipe bend, the essential features of the method of formation of which are as above described, but in which the closing member, 3, is a flat plate, instead of being of bowl form as in the instance first described. In this case, the ends of the pipe sections, 1, 1, are, as before, preferably first squared, and the pipe sections are swaged outwardly to form plane connecting faces, 1ª. Before welding the pipe sections together, the metal of the outwardly swaged portions is cut out, so as to leave open spaces of substantially D form, the walls extending around the inner and side portions of which are beveled, to receive welding material, 2. The pipe sections are then welded together, and the closing member, 3, welded to their ends, as in the instance first described.

I claim as my invention, and desire to secure by Letters Patent:

1. The improvement in the manufacture of pipe bends which consists in swaging outwardly the walls of two pipe sections so as to provide plane contact faces at and adjoining their ends, welding said faces together, and welding a closing member to the connected ends of the two pipe sections.

2. The improvement in the manufacture of pipe bends which consists in squaring the ends of two pipe sections, swaging their walls outwardly so as to provide plane contact faces at and adjoining their ends, welding said faces together, and welding a closing member to the connected ends of the two pipe sections.

3. The improvement in the manufacture of pipe bends which consists in swaging outwardly the walls of two pipe sections so as to provide plane contact faces at and adjoining their ends, of width substantially equal to the diameter of the pipe sections, welding said faces together, and welding a closing member to the connected ends of the pipe sections.

4. The improvement in the manufacture of pipe bends which consists in swaging outwardly the walls of two pipe sections so as to provide plane contact faces at and adjoining their ends, cutting out the metal within the side and end walls of said faces, welding said walls together, and welding a closing member to the connected ends of the two pipe sections.

FRANCIS J. COLE.

Witnesses:
S. W. Tyler,
Frank F. Scoville.